May 29, 1928. 1,671,506
J. BERTRAND
RESILIENT SUSPENSION DEVICE FOR VEHICLES
Filed Nov. 4, 1926
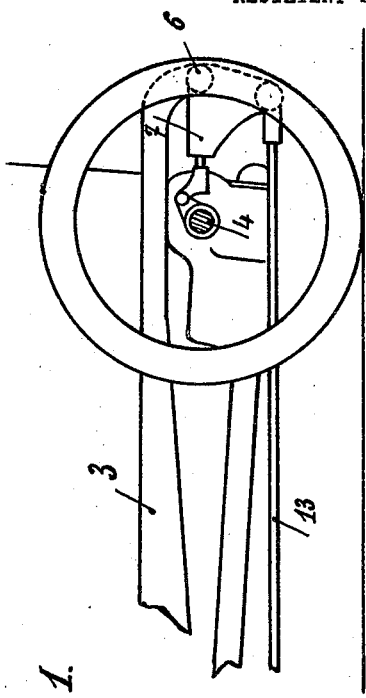
Fig. 1.
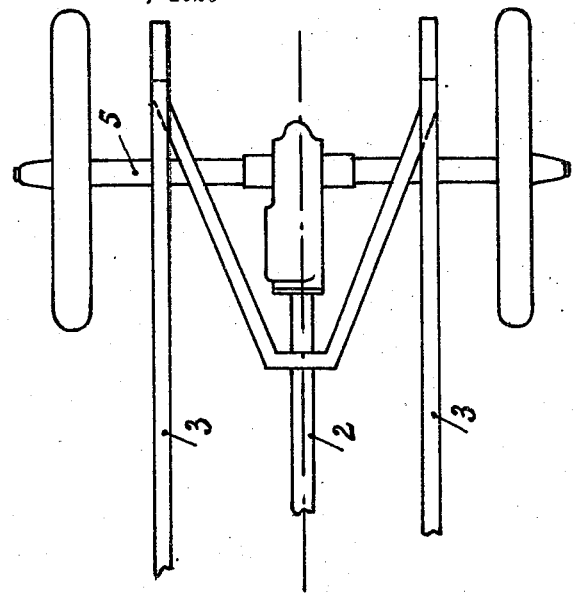
Fig. 2.
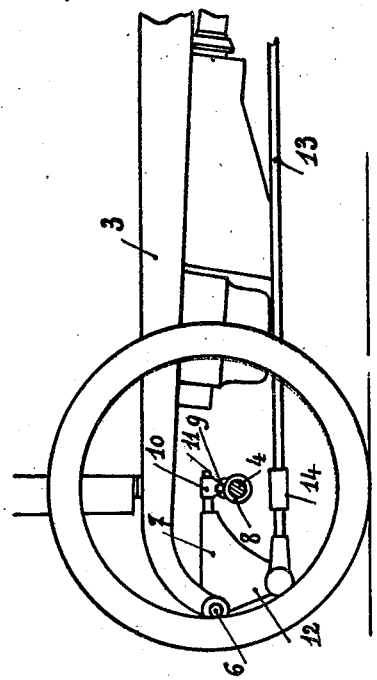
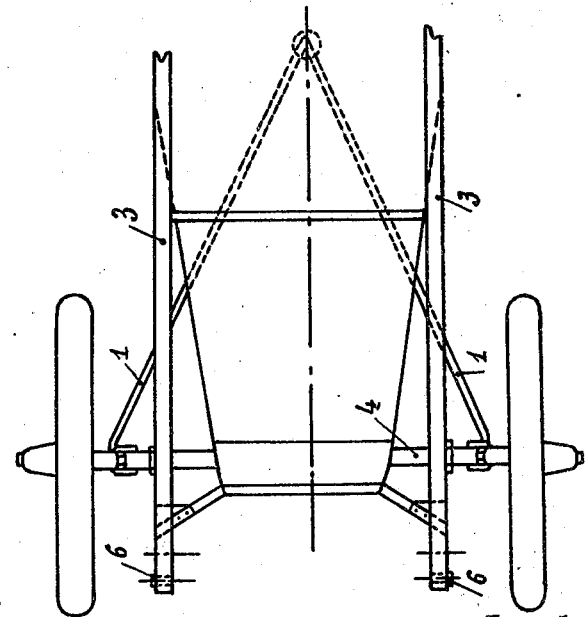
Inventor
Jean Bertrand.
By William C. Sinton
Attorney.

Patented May 29, 1928.

1,671,506

UNITED STATES PATENT OFFICE.

JEAN BERTRAND, OF VERSAILLES, FRANCE.

RESILIENT SUSPENSION DEVICE FOR VEHICLES.

Application filed November 4, 1926, Serial No. 146,277, and in France November 13, 1925.

My invention relates to an improved device for resilient suspension which is chiefly applicable to motor vehicles. It consists essentially in the fact that the vehicle frame is supported upon the axles through the medium of four bell crank levers which are pivotally connected with the longitudinal beams of the vehicle frame, the arms of said levers being connected together in pairs on each side of the frame by a rod which although substantially rigid is slightly flexible, whilst the other arms of the levers are supported upon the axles.

A suspension device has already been proposed in which the arms of the front levers are connected with the arms of the rear levers by springs subjected to compression or extension, but hitherto no use has been made of rods which although substantially rigid are slightly flexible, such rods offering the special feature as compared with springs consisting in the fact that the resistance of the rods to the stresses decreases as they are bent, whereas the resistances of the springs subjected to compression or traction will increase.

The invention will be hereinafter described with reference to the diagrammatic drawings in which:

Fig. 1 is an elevational view and Fig. 2 a plan view of a suspension arrangement for a vehicle in accordance with the invention.

In the drawings, 1 is the ordinary triangle connecting the front axle with the vehicle frame by a ball joint; 2 is the driving shaft for the rear axle; 3—3 are the longitudinal beams of the vehicle frame.

The elastic suspension of the vehicle frame from the axles of the wheels is effected in the following manner in accordance with the invention. The longitudinal beams are mounted upon the front and rear axles 4 and 5 by means of bell crank levers whose pivoting shafts 6 are mounted in suitable curved ends of the longitudinal beams 3 or in separately secured members.

The connection between the arms 7 of the bell crank levers and the vehicle axles is effected by means of the links 8 which are rotatably mounted on the vehicle axles and are pivotally connected with the ends of the arms 7. In the construction shown in the drawings, the said links are mounted on the vehicle axles by suitable collars, and are pivoted at 9 to the sleeves 10 which are slidable on the rods 11 mounted on the ends of the arms 7.

On each side of the vehicle the arms 12 of the said bell crank levers are connected together by rods 13 which are substantially rigid but are slightly flexible, said rods being provided with the turnbuckles 14.

It has been shown by experience that in certain cases the rods 13 which will bend to a slight degree by reason of their length, will be sufficient to provide a very easy and flexible motion for the suspension, whereas in other cases the said rods will act by their rigidity in such manner as to transfer from one axle to the other the stresses which would tend to distort the vehicle frame, and at the same time they will exercise a damping effect upon the reactions.

The said rods which consist of metal or other suitable material, may be made solid or hollow, or may be given any suitable cross section whereby they will be sufficiently rigid but will be enabled to bend to a slight degree. Instead of a single rod, two or more rods connected together may be employed.

The invention is evidently not limited to the particular construction and arrangement of parts hereinabove described which may be varied as required without exceeding the scope of the invention.

Having so described my said invention and how it is to be performed, I declare that what I claim is:

1. In a vehicle, a front and rear axle, a load supporting frame, a bell crank lever pivoted to each end of the frame adjacent the front and rear axle, one arm of each bell crank lever being freely mounted on its respective axle, and an adjustable yieldable rod interconnecting said bell crank levers at their remaining arm.

2. In a vehicle, a front and rear axle, each having a movable sleeve mounted thereon, a load supporting frame, a bell crank lever pivoted to each end of the frame, adjacent the front and rear axle, one arm of each bell crank lever being slidably engaged within the movable sleeve on its respective axle, and an adjustable yieldable rod interconnecting said bell crank levers at their remaining arm.

In testimony whereof I have affixed my signature.

JEAN BERTRAND.